W. A. RIDDELL.
FOLDING CAMERA BED.
APPLICATION FILED OCT. 20, 1915.

1,215,412.

Patented Feb. 13, 1917.
2 SHEETS—SHEET 1.

WITNESSES:
Nelson H. Copp
Walter D. Payne

INVENTOR
William A. Riddell
BY
his ATTORNEYS

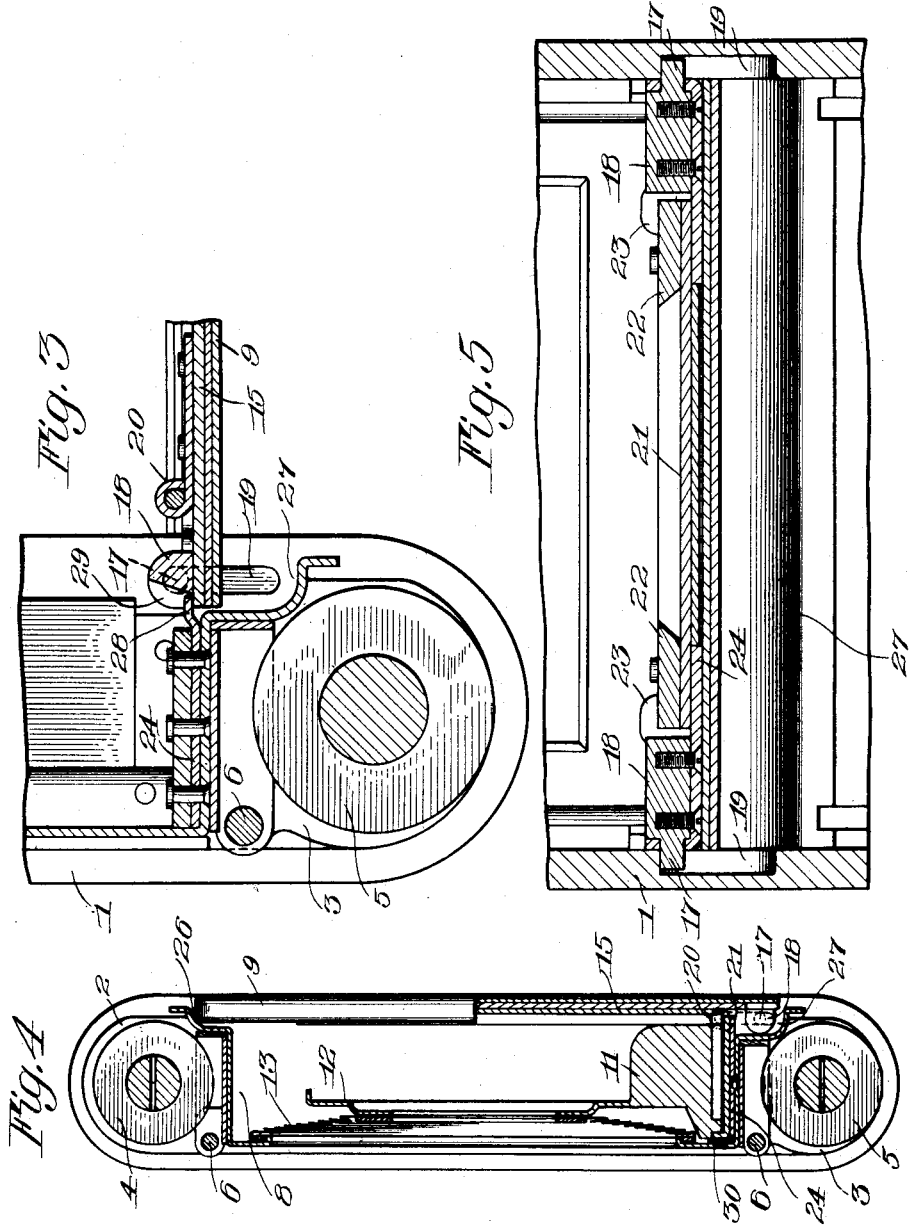

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

FOLDING-CAMERA BED.

1,215,412.  Specification of Letters Patent.  Patented Feb. 13, 1917.

Application filed October 20, 1915.  Serial No. 56,948.

*To all whom it may concern:*

Be it known that I, WILLIAM A. RIDDELL, of Rochester, in the county of Monroe and State of New York, have invented certain new and useful Improvements in Folding-Camera Beds; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a folding camera having a relatively long bed in proportion to the general dimensions of the camera, and hence a greater range of adjustment on the part of the lens for focusing purposes, the improvements being specially applicable to cameras of the type in which the bed also constitutes the door for closing the bellows chamber at the front of the camera. Further objects are to provide an improved arrangement whereby the lens carriage may be transferred from the bed to the bellows chamber or vice versa in a smooth and easy manner. To these and other ends the invention resides in certain improvements and combinations of parts, all as will be hereinafter more fully described, the novel features being pointed out in the claims at the end of the specification.

In the drawings:

Fig. 3 is a fragmentary section, much enlarged, taken substantially on the line 3—3 of Fig. 2;

Fig. 4 is a section similar to Fig. 1 but showing the camera closed or folded, and Fig. 5 is a transverse section through the bed on the scale of Fig. 3, taken substantially on the line 5—5 of Fig. 2.

Similar reference numerals throughout the several figures indicate the same parts.

Figure 1:
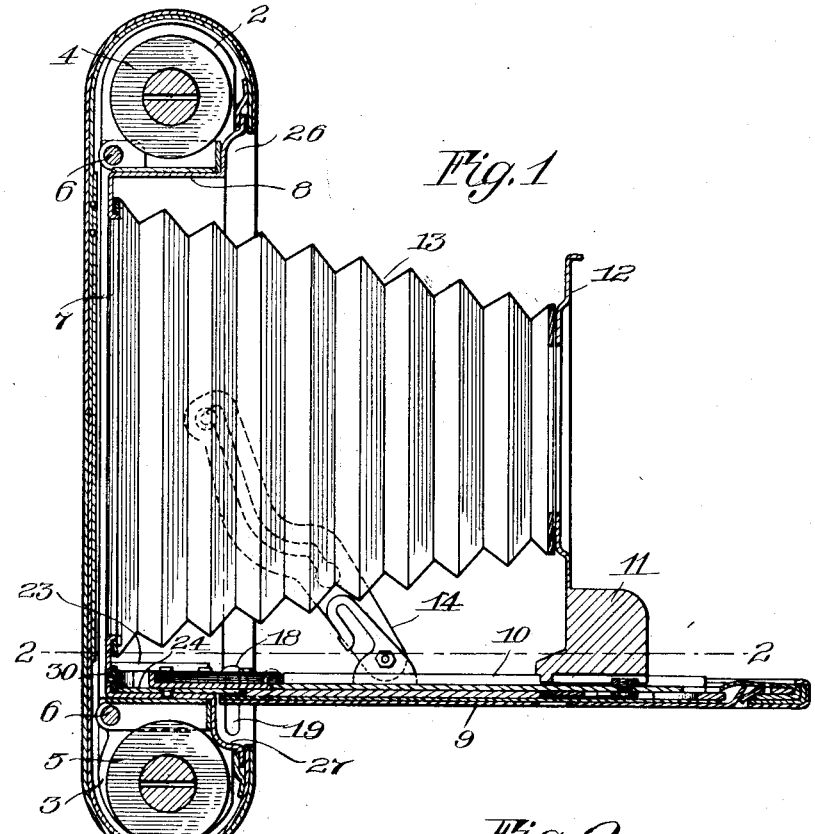
Figure 1 is a central vertical section through a folding film camera constructed in accordance with and illustrating one embodiment of my invention, the camera being in extended position.
Figure 2:
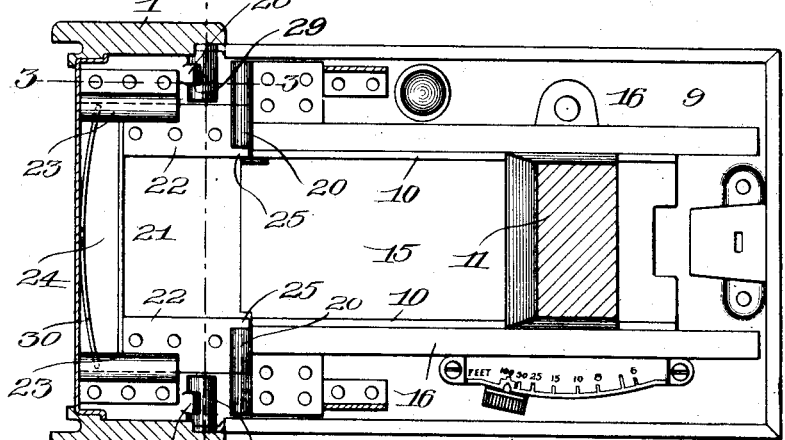
Fig. 2 is a horizontal section taken substantially on the line 2—2 of Fig. 1.

As to its major elements, the camera may be constructed as usual and in the present embodiment comprises a body 1 having film chambers 2 and 3 at the ends thereof for the reception of film spools 4 and 5 from one to the other of which the film is wound over rollers 6 past the exposure opening 7 at the rear of an intermediate bellows chamber 8 opening at the front of the camera. This bellows chamber may be closed, as in Fig. 4, by a bed 9 which when extended, as in Fig. 1, constitutes the camera bed. The said bed is fitted with tracks 10 on which slides a lens carriage 11 carrying a front 12 to which is connected the forward end of the bellows 13 having its rear end surrounding the exposure opening 7. In its extended position, the door or bed 9 is supported by the usual links 14. In the particular camera shown, the tracks 10 are a part of an extension bed 15 slidable in guides 16 on the bed 9, but this circumstance has nothing to do with the present invention and may be disregarded.

In the practice of my present invention, the bed 9 is connected to the body 1 by sliding pivots 17 (Fig. 5) carried by bosses 18 at the rear end thereof and operating in vertically disposed slot-shaped recesses 19 in the side walls of the body just forward of the bellows chamber 8. At a point beyond the sliding axis 17 and in front thereof, there is pivoted to the bed at 20 a bridge piece 21 having tracks 22 thereon in alinement with the tracks 10 when the bed is extended. This bridge piece 21 is slidable in guides 23 on the floor 24 of the bellows chamber 8 in a forward and rearward direction and extensions 25 on the tracks 22 project beyond the pivotal center 20 into close proximity to the rear ends of the tracks 10. There is thus no difficulty in sliding the carriage 11 from the tracks 10 onto the tracks 22 on the bridge piece and the latter sustains the carriage well back within the bellows chamber 8 when it is folded within the camera, as shown in Fig. 4.

The operation is very simple and will now be described. With the parts in the folded position of Fig. 4, upon releasing the door or bed 9 and swinging it outwardly to the horizontal position of Fig. 1, the pivots 17 act as a fulcrum for drawing out the bridge piece 21 in its guides 23 a short distance and with it the carriage 11. Because of this sliding movement of the bridge piece and its pivotal connection with the bed at 20, the pivots 17 are, by this same operation, drawn upwardly in the recesses 19 and the bed elevated to the position of Fig. 1 so that it is brought to the level of the floor of the bellows chamber 8. The tracks 22 and 10 are thus brought into alinement and the carriage 11 is free to be moved from one to the other in extending the bellows 13. In this way, the bed 9 may be made longer than usual and greater range of focal adjustment consequently allowed the carriage 11 supporting the lens. To accommodate this lengthened bed which ordinarily extends only the height of the bellows chamber 8, advantage is taken of the space at the inner forward corners of the film chambers 2 and 3 by forming depressions 26 and 27 at the front of the body for the top and bottom edges of the bed. As the camera is closed after transferring the carriage 2 back onto the bridge piece 21, the bridge piece is thrust inwardly again and forces the sliding pivots 17 of the bed downwardly again so that the inner end of the latter subsides into the recess 27 and allows the outer end to close into the recess or depression 26.

Offset extensions 28 on the floor plate 24 may be let into cutaway portions 29 in the bosses 18 to guide the bed in a true vertical plane and prevent lateral movement when it is swung on its pivots.

A spring 30 placed within the body in rear of the bridge piece 21 and compressed thereby when the camera is folded will aid in projecting the parts when the bed 9 is released from its folded position.

I claim as my invention:

1. In a folding photographic camera, the combination with a body, of a bed hinged thereto and also having one end slidable relatively to the body in a direction transverse to the plane of the bed when the latter is in operative position.

2. In a folding photographic camera, the combination with a body, of a bed having a slidable and a pivotal connection with the body.

3. In a folding photographic camera, the combination with a body having a bellows chamber and a bed constituting a door for said chamber, of a sliding pivot connecting the body and bed.

4. In a folding photographic camera, the combination with a body, a bed hinged thereto and a lens carriage movable on the bed, of a bridge piece connecting the bed and body and adapted to receive the carriage, said bridge piece being slidably connected to one part and hinged to the other on a fixed pivot.

5. In a folding photographic camera, the combination with a body, a bed hinged thereto on a sliding axis and a lens carriage movable on the bed, of a rigid bridge piece connecting the bed and body and adapted to receive the carriage, said bridge piece being slidably connected to one part and pivotally connected to the other.

6. In a folding photographic camera, the combination with a body having a guide, a bed hinged to the body on a sliding axis and a lens carriage movable on the bed, of a rigid bridge piece connecting the bed and body and adapted to receive the carriage, said bridge piece being slidably mounted in the guide in the body and permanently pivoted to the bed.

7. In a folding photographic camera, the combination with a body having a guide on the floor thereof and vertical guides on its inner side walls, of a bed having laterally projecting pivots movable in the vertical guides, a lens carriage movable on the bed, and a bridge piece connecting the bed and body for the passage of the carriage into the latter, said bridge piece being slidably mounted in the floor guide of the body and pivoted to the bed at a point beyond the said lateral pivots thereof.

8. In a folding photographic camera, the combination with a body having a bellows chamber opening at the front and a depression in the front of the body below the floor of said chamber, of a bed longer than the open front of the chamber having one end adapted to occupy the said depression when folded and connected to the body by a sliding pivot movable into substantial alinement with the floor of the bellows chamber when the bed is swung outwardly to extended position.

9. In a folding photographic camera, the combination with a body having a bellows chamber opening at the front and a depression in the front of the body below the floor of said chamber, of a bed longer than the open front of the chamber having one end adapted to occupy the said depression when folded and connected to the body by a sliding pivot movable into substantial alinement with the floor of the bellows chamber when the bed is swung outwardly to extended position and means for so moving the pivot of the bed automatically when the bed is extended.

10. In a folding photographic camera, the combination with a body having a bellows chamber opening at the front and a depression in the front of the body below the floor of said chamber, of a bed longer than the open front of the chamber having one end adapted to occupy the said depression when folded and connected to the body by a sliding pivot movable into substantial alinement with the floor of the bellows chamber when the bed is swung outwardly to extended position, a carriage movable on the bed, and a bridge piece slidable on the floor of the bellows chamber and pivoted to the bed to receive the carriage therefrom, said bridge piece operating to move the pivot of the bed into such alinement with the floor of the bellows chamber automatically when the bed is swung outwardly to extended position.

11. In a folding photographic camera, the combination with a body having a guide, a bed hinged to the body on a sliding axis and a lens carriage movable on the bed, of a bridge piece connecting the bed and body and adapted to receive the carriage, said bridge piece being slidably mounted in the guide in the body and pivoted to the bed so that it is withdrawn as the bed is extended, and a spring acting between the bridge piece and body and having a tendency to project the bridge piece and bed.

WILLIAM A. RIDDELL.

Witnesses:
P. WESLEY HART,
F. M. PAGE.

Copies of this patent may be obtained for five cents each, by addressing the "Commissioner of Patents, Washington, D. C."